(12) United States Patent
Lei

(10) Patent No.: US 12,684,583 B2
(45) Date of Patent: Jul. 14, 2026

---

(54) METHOD AND APPARATUS FOR TIME DOMAIN RESOURCE ALLOCATION

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 497 days.

(21) Appl. No.: 18/269,690

(22) PCT Filed: Dec. 28, 2020

(86) PCT No.: PCT/CN2020/140140
§ 371 (c)(1),
(2) Date: Jun. 26, 2023

(87) PCT Pub. No.: WO2022/140912
PCT Pub. Date: Jul. 7, 2022

(65) Prior Publication Data
US 2024/0064755 A1 Feb. 22, 2024

(51) Int. Cl.
*H04W 72/23* (2023.01)
*H04W 72/0446* (2023.01)
*H04W 72/1273* (2023.01)

(52) U.S. Cl.
CPC ....... *H04W 72/23* (2023.01); *H04W 72/0446* (2013.01); *H04W 72/1273* (2013.01)

(58) Field of Classification Search
CPC ........... H04W 72/231; H04W 72/1273; H04W 72/1284; H04W 72/0446; H04W 72/127;
(Continued)

(56) References Cited

U.S. PATENT DOCUMENTS 11,071,172 B2 * 7/2021 He .................... H04W 52/0251
2020/0351934 A1 11/2020 Khoshnevisan
(Continued)

FOREIGN PATENT DOCUMENTS

| CN | 111901885 A | 11/2020 |
| CN | 111953625 A | 11/2020 |
| WO | 2020198947 A1 | 10/2020 |

OTHER PUBLICATIONS

Intel Corporation , "Enhancements to HARQ for NR-unlicensed", 3GPP TSG RAN WG1 Meeting #99, R1-1912199, Reno, USA [retrieved Apr. 20, 2023]. Retrieved from the Internet <https://www.3gpp.org/ftp/tsg_ran/WG1_RL1/TSGR1_99/Docs>., Nov. 2019, 13 Pages.
(Continued)

*Primary Examiner* — Wei Zhao
(74) *Attorney, Agent, or Firm* — FIG. 1 Patents

(57) ABSTRACT

Embodiments of the present disclosure relate to time domain resource allocation for uplink and downlink transmissions. According to some embodiments of the disclosure, a method may include: receiving a DCI format scheduling a plurality of PDSCHs or a plurality of PUSCHs on a plurality of carriers, wherein each PDSCH or PUSCH is scheduled on a corresponding carrier, and the DCI format includes a first indicator indicating a first time domain resource allocation pattern from a first set of time domain resource allocation patterns for the plurality of PDSCHs or PUSCHs; and receiving the plurality of PDSCHs or transmitting the plurality of PUSCHs on a plurality of time domain resources within a plurality of slots based on the first time domain resource allocation pattern, wherein each of the plurality of time domain resources is within a corresponding one of the plurality of slots.

20 Claims, 10 Drawing Sheets

(58) Field of Classification Search
CPC .... H04W 72/23; H04W 72/128; H04L 1/181; H04L 1/18

See application file for complete search history.

(56) References Cited

U.S. PATENT DOCUMENTS

| | | | | |
|---|---|---|---|---|
| 2022/0159568 A1* | 5/2022 | Kim | .................. | H04W 52/0212 |
| 2023/0006798 A1* | 1/2023 | Lee | ....................... | H04L 5/0055 |
| 2023/0155773 A1* | 5/2023 | Zhang | ................. | H04W 72/232 |
| | | | | 370/329 |

OTHER PUBLICATIONS

Lenovo , "HARQ enhancement for NR-U", 3GPP TSG RAN WG1 #96bis, R1-1904582, Xi'an, China [retrieved Apr. 20, 2023]. Retrieved from the Internet <https://www.3gpp.org/ftp/TSG_RAN/WG1_RL1/TSGR1_96b/Docs/>., Apr. 2019, 7 Pages.

PCT/CN2020/140140 , "International Preliminary Report on Patentability", PCT Application No. PCT/CN2020/140140, Jul. 13, 2023, 6 pages.

PCT/CN2020/140140 , "International Search Report and Written Opinion", PCT Application No. PCT/CN2020/140140, Sep. 28, 2021, 7 pages.

20967264.1 , "Extended European Search Report", EP Application No. 20967264.1, Aug. 30, 2024, 13 pages.

AT&T , "RAN1 UE features list for Rel-16 NR", 3GPP TSG RAN WG1 #100-e, R1-2000930, e-Meeting, Feb. 2020, 157 pages.

CMCC , "FL Summary on support of unaligned frame boundary for R16 NR inter-band CA", 3GPP TSG RAN WG1 #99, draft R1-1913347, Reno, USA, Nov. 2019, 18 pages.

* cited by examiner

400

600

| | LTE CRS |
| | LTE PDCCH |
| | LTE PDSCH |
| | NR PDSCH |
| | NR PDCCH |

611 f t

800 receiving a DCI format scheduling a plurality of PDSCHs or a plurality of PUSCHs on a plurality of carriers — 811 receiving the plurality of PDSCHs or transmitting the plurality of PUSCHs on a plurality of time domain resources within a plurality of slots — 813

900 transmitting a DCI format scheduling a plurality of PDSCHs or a plurality of PUSCHs on a plurality of carriers — 911 transmitting the plurality of PDSCHs or receiving the plurality of PUSCHs on a plurality of time domain resources within a plurality of slots — 913

METHOD AND APPARATUS FOR TIME DOMAIN RESOURCE ALLOCATION

TECHNICAL FIELD

Embodiments of the present disclosure generally relate to wireless communication technology, and more particularly to time domain resource allocation for uplink (UL) and downlink (DL) transmissions.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

In a wireless communication system, a user equipment (UE) may monitor a physical downlink control channel (PDCCH), which may carry downlink control information (DCI). The DCI may schedule uplink channels, such as a physical uplink shared channel (PUSCH), or downlink channels, such as a physical downlink shared channel (PDSCH).

There is a need for handling time domain resource allocation for UL and DL transmissions in a wireless communication system.

SUMMARY

Some embodiments of the present disclosure provide a method for wireless communication performed by a user equipment (UE). The method may include: receiving a downlink control information (DCI) format scheduling a plurality of physical downlink shared channels (PDSCHs) or a plurality of physical uplink shared channels (PUSCHs) on a plurality of carriers, wherein each PDSCH or PUSCH is scheduled on a corresponding carrier, and the DCI format includes a first indicator indicating a first time domain resource allocation pattern from a first set of time domain resource allocation patterns for the plurality of PDSCHs or PUSCHs; and receiving the plurality of PDSCHs or transmitting the plurality of PUSCHs on a plurality of time domain resources within a plurality of slots based on the first time domain resource allocation pattern, wherein each of the plurality of time domain resources is within a corresponding one of the plurality of slots.

Some embodiments of the present disclosure provide a method for wireless communication performed by a base station (BS). The method may include: transmitting a downlink control information (DCI) format scheduling a plurality of physical downlink shared channels (PDSCHs) or a plurality of physical uplink shared channels (PUSCHs) on a plurality of carriers, wherein each PDSCH or PUSCH is scheduled on a corresponding carrier, and the DCI format includes a first indicator indicating a first time domain resource allocation pattern from a first set of time domain resource allocation patterns for the plurality of PDSCHs or PUSCHs; and transmitting the plurality of PDSCHs or receiving the plurality of PUSCHs on a plurality of time domain resources within a plurality of slots, wherein each of the plurality of time domain resources is within a corresponding one of the plurality of slots.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
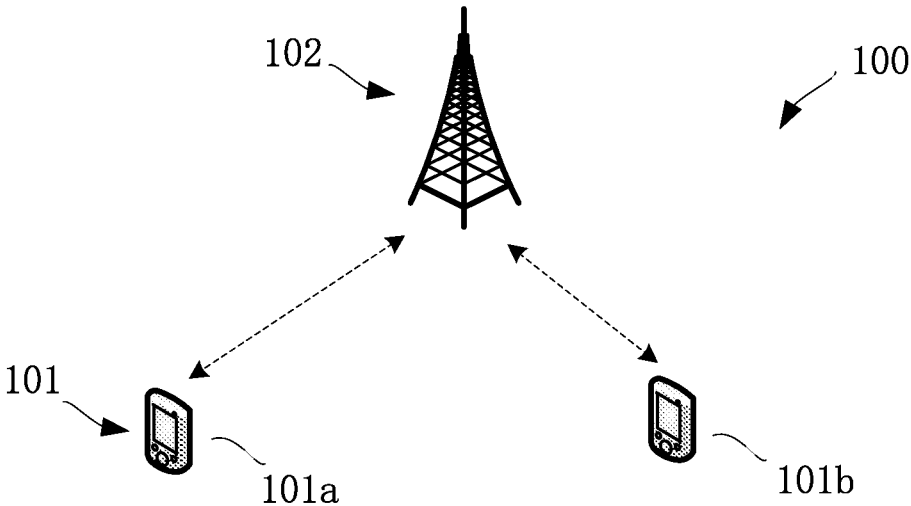
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101*a* and UE 101*b*) and a base station (e.g., BS 102). Although a specific number of UEs 101 and BS 102 are depicted in FIG. 1, it is contemplated that any number of UEs and BS s may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s) 101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BS s 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with the 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support carrier aggregation (CA), which supports a plurality of carriers for improving data rate. An individual unit frequency bound by CA is referred to as a component carrier (CC). A CC may correspond to a serving cell. CA provides the same effect as the case in which a plurality of bands, which are physically continuous or non-continuous in the frequency domain, are bound and used as a logically large band. For example, BS 102 and UE 101*a* may communicate with each other using spectrums allocated in a CA including a plurality of CCs. The plurality of CCs may include a primary CC and one or more secondary CCs. A primary CC may be referred to as a primary cell (PCell) and a secondary CC may be referred to as a secondary cell (SCell).

Dynamic spectrum sharing (DSS) was introduced in 3GPP release 15 (R15) with enhancements in 3GPP release 16 (R16) for LTE and NR co-existence on the same frequency. On a carrier shared by LTE and NR, the NR transmission cannot use resource elements (REs) occupied by LTE signals such as cell reference signals (CRSs) and the LTE PDCCH region, in order to avoid any interference with the LTE system. Hence, on the shared carrier, the PDCCH capacity of NR may be relatively limited. Considering that low frequency is more preferred to be configured as a PCell in a CA framework due to coverage improvement, when a carrier in a low frequency shared by LTE and NR is configured as a NR PCell, the insufficient NR PDCCH capacity on the NR PCell may result in system performance degradation, especially when more NR devices are camped on the NR PCell.

As an objective of 3GPP release 17 (R17) DSS, to solve the NR PDCCH capacity issue, a mechanism which schedules a PDSCH on a NR PCell from a PDCCH on a NR SCell is introduced. In addition, the benefits of scheduling a plurality of cells by a single DCI, for example, a single DCI on PCell or SCell scheduling a PDSCH on both a PCell and a SCell, is considered. Since a NR-only SCell is usually configured with a larger bandwidth than the NR PCell on the shared carrier, PCell scheduling for R17 NR UEs can be offloaded to the NR SCell. In this way, the network can have sufficient PDCCH capacity for scheduling NR UEs on the shared carrier.

On the other hand, supporting NR cross-carrier scheduling such as from a SCell to a PCell may require additional (for example, almost double for the same loading on both cells) PDCCH capacity for the scheduling SCell, due to the need for self-scheduling on the SCell as well cross-carrier scheduling on the (shared carrier) PCell. Thus, PDCCH capacity on the SCell may be a potential issue when a large number of UEs are configured on the SCell or the SCell is not configured with large enough bandwidth. This issue can be addressed by allowing a single DCI on a carrier to schedule PDSCHs on two (or more) carriers. For example, two PDSCHs on two carriers may be scheduled by a single DCI format, which would save PDCCH scheduling overhead.

Figure 2:
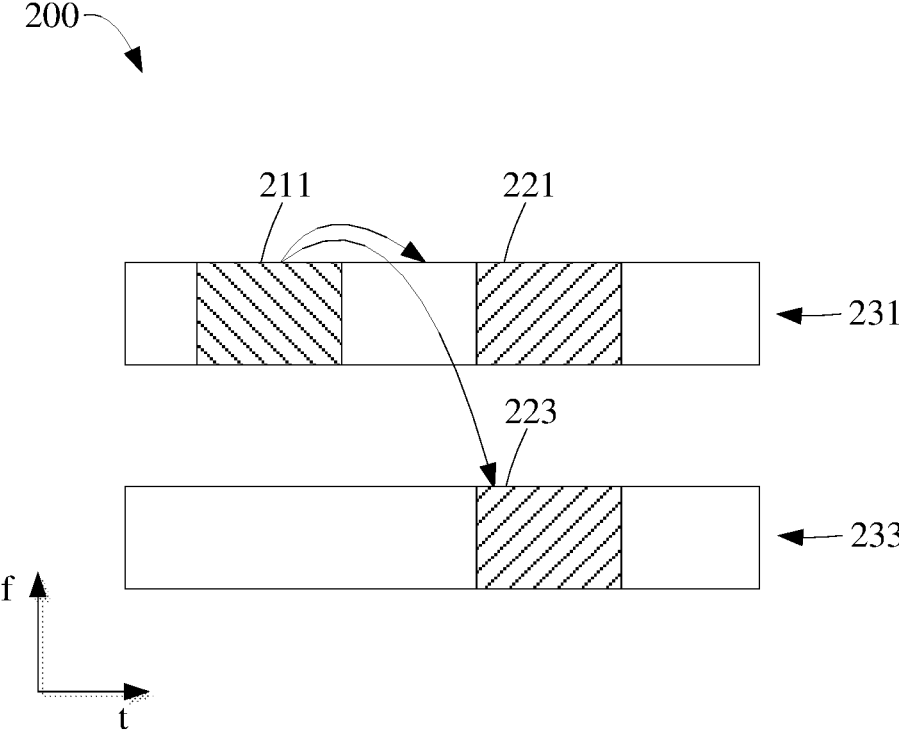
FIG. 2 illustrates a schematic diagram of a DCI format scheduling a plurality of PDSCH transmissions on a plurality of carriers in accordance with some embodiments of the present disclosure.

FIG. 2 illustrates a schematic diagram 200 of a DCI format scheduling a plurality of PDSCH transmissions on a plurality of carriers in accordance with some embodiments of the present disclosure.

Referring to FIG. 2, a plurality of CCs (including but not limited to CC 231 and CC 233) may be configured for a UE. It should be understood that the sub-carrier spacings (SCSs) of the carriers configured for a UE may be the same or different. Each of the plurality of CCs may correspond to a respective serving cell of the UE.

As shown in FIG. 2, instead of using two DCI formats to respectively schedule two PDSCHs (e.g., PDSCH 221 and PDSCH 223) on the two carriers (e.g., CC 231 and CC 233), a BS may transmit one DCI format (DCI format #1) in PDCCH 211 on CC 231 to schedule PDSCH 221 on CC 231 and PDSCH 223 on CC 233. In the example of FIG. 2, PDSCH 221 is self-scheduled on the same carrier (i.e., CC 231) with DCI format #1, and PDSCH 223 is cross-carrier scheduled on a different carrier (i.e., CC 233).

Figure 3:
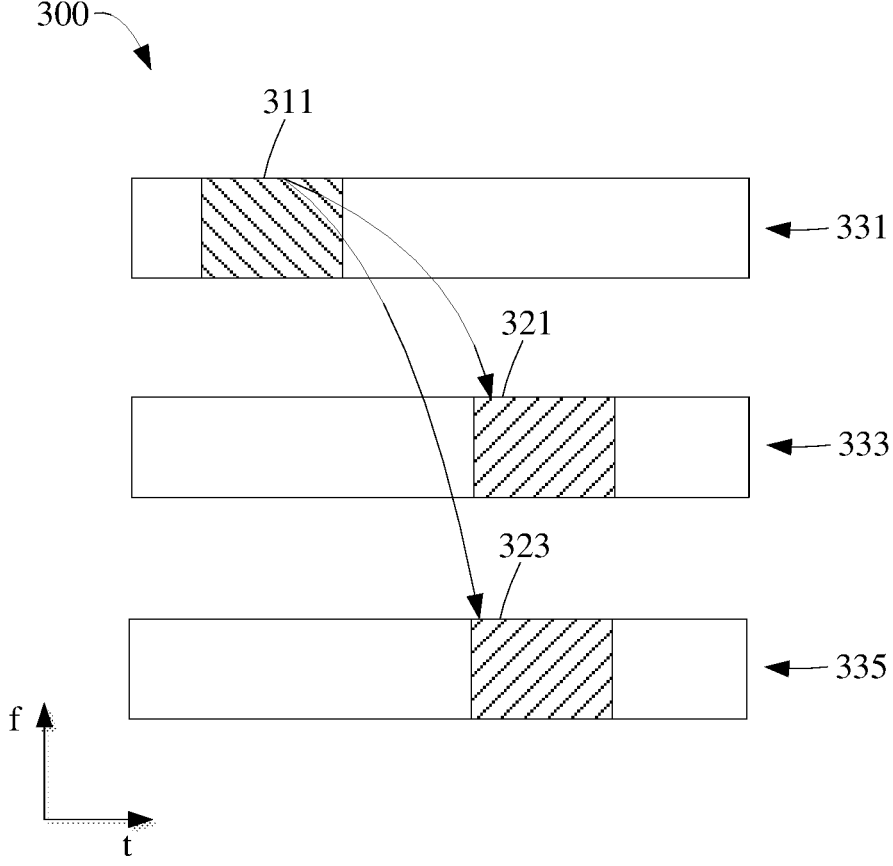
FIG. 3 illustrates a schematic diagram of a DCI format scheduling a plurality of PDSCH transmissions on a plurality of carriers in accordance with some embodiments of the present disclosure.

FIG. 3 illustrates a schematic diagram 300 of a DCI format scheduling a plurality of PDSCH transmissions on a plurality of carriers in accordance with some embodiments of the present disclosure.

Referring to FIG. 3, a plurality of CCs (including but not limited to CCs 331-335) may be configured for a UE. It should be understood that the SCSs of the carriers configured for a UE may be the same or different. Each of the plurality of CCs may correspond to a respective serving cell of the UE.

As shown in FIG. 3, a BS may transmit one DCI format (DCI format #2) in PDCCH 311 on CC 331 to schedule PDSCH 321 on CC 333 and PDSCH 323 on CC 335. In the example of FIG. 3, PDSCHs 321 and 323 are cross-carrier scheduled on a carrier (i.e., CC 331) different from the ones (i.e., CCs 333 and 335) on which the PDSCHs are scheduled.

Although a single DCI format respectively schedules two PDSCHs on two carriers in FIGS. 2 and 3, it should be appreciated by persons skilled in the art that a single DCI format may schedule any number of PDSCHs on any number of carriers, respectively.

In practice, the NR-only carrier and the shared carrier are much likely on different frequency bands with inter-band CA. For example, the shared carrier on a relatively low frequency band (e.g., 800 MHz) may be configured as a NR PCell (due to better coverage) and the NR-only carrier on a relatively high frequency band (e.g., 3.5 GHz) may be configured as a NR SCell. Due to the large frequency separation between the two bands, the channel conditions of the NR PCell and NR SCell are relatively less correlated. It would be difficult to assume the same link adaptation property on the two cells and use single fields to indicate, for example, the same modulation and coding scheme (MCS), frequency domain resource allocation as well as time domain resource allocation.

Furthermore, scheduling a PDSCH on the shared carrier needs to avoid LTE signals such as the LTE CRSs and LTE PDCCH regions while there is no such restriction on the NR-only carrier. Consequently, using the same field indicating the same time domain resource allocation on the two carriers may lead to scheduling inflexibility to some extent. For full flexibility scheduling, for example, two PDSCHs on two carriers by a single DCI, almost all the related fields in the two-carrier scheduling DCI need to be doubled except the 24-bit cyclic redundancy check (CRC). The larger the DCI payload size, the lower the transmission reliability and less coverage. As a result, further overhead reduction would be required for the multi-carrier scheduling DCI at the cost of a potential reduction in scheduling flexibility.

Although the above issues are described with respect to a specific network architecture or application scenario, it should be appreciated by persons skilled in the art that the above issues may exist in other specific network architectures or application scenarios. Moreover, although the above issues are described with respect to a DL case, it should be appreciated by persons skilled in the art that the above issues may exist in a UL case, for example, using a single DCI scheduling a plurality of PUSCHs on a plurality of carriers.

Embodiments of the present disclosure provide solutions to facilitate DL transmissions (e.g., PDSCHs) and UL transmissions (e.g., PUSCHs) scheduled by a single DCI. The disclosed solutions can solve the above problems. For example, solutions that can compress the signaling overhead for time domain resource allocation indication are disclosed. More details on the embodiments of the present disclosure will be illustrated in the following text in combination with the appended drawings.

The following embodiments may be described with respect to a DL case (e.g., PDSCH), it should be appreciated by persons skilled in the art that the following embodiments are also applicable to a UL case (e.g., PUSCH), without departing from the spirit and scope of the disclosure.

In some embodiments of the present disclosure, at least two sets of time domain resource allocation (TDRA) patterns may be configured by RRC signaling. Among the at least two TDRA pattern sets, at least one TDRA pattern set is only applicable to single carrier PDSCH scheduling (or single carrier PUSCH scheduling in a UL case) and at least one TDRA pattern set is only applicable to multiple carrier PDSCH scheduling (or multiple carrier PUSCH scheduling in a UL case).

A DCI format may indicate (hereinafter, "TDRA pattern set indicator") which one of the at least two TDRA pattern sets is applied to the PDSCH(s) (or PUSCH(s)) scheduled by the DCI format. A size (e.g., the number of bits) of the TDRA pattern set indicator may be determined based on the number of sets of the at least two TDRA pattern sets. For example, in the case of two TDRA pattern sets are configured, the DCI format may include 1 bit (i.e., $[\log_2(2)]$ bit) to indicate the TDRA pattern set applied to the scheduled PDSCH(s) (or PUSCH(s)).

In this way, a single DCI format can be used to schedule either one PDSCH (or PUSCH) on one carrier or a plurality of PDSCHs (or PUSCHs) on a plurality of carriers. For example, when the TDRA pattern set indicator indicates that the TDRA pattern set for multiple carrier PDSCH scheduling is applied, the UE may assume that a plurality of PDSCHs are scheduled on a plurality of carriers. When the TDRA pattern set indicator indicates the TDRA pattern set only for single carrier PDSCH scheduling is applied, the UE may assume that a single PDSCH is scheduled on a single carrier.

Since each of the TDRA pattern sets may include one or more TDRA pattern, the DCI format may further indicate (hereinafter, "TDRA indicator") which TDRA pattern is applied to the PDSCH(s) (or PUSCH(s)) scheduled by the DCI format.

A size (e.g., the number of bits) of the TDRA indicator may be determined based on the numbers of TDRA patterns in the at least two TDRA pattern sets. For example, when two TDRA pattern sets are configured, one TDRA pattern set includes $N_1$ TDRA patterns and the other TDRA pattern set includes $N_2$ TDRA patterns, the DCI format may include $\lceil \log_2 N \rceil$ bits (where $N=\max(N_1, N_2)$) to indicate the TDRA pattern applied to the scheduled PDSCH(s) (or PUSCH(s)). In some examples, the maximum values of $N_1$ and $N_2$ may be configured from a set of {8, 16, 32, etc.}.

Some fields, for example, the hybrid automatic repeat request (HARQ) process number, the frequency domain resource allocation indicator, the modulation and coding scheme (MCS), and so on, in the DCI format, may be PDSCH-specific (or PUSCH-specific) fields. In other words, these fields may be configured per respective scheduled PDSCH (or PUSCH). The payload size of the DCI format may be determined based on the maximum number of PDSCHs (or PUSCHs) among all TDRA patterns of the at least two TDRA pattern sets which can be scheduled by the DCI format. For example, assuming that one TDRA pattern set includes a TDRA pattern that can schedule a maximum of X PDSCH among all TDRA patterns of the at least two TDRA pattern sets, the payload size may be determined based on the value of X. When the number of actually scheduled PDSCHs is smaller than the maximum number of schedulable PDSCHs (e.g., X), the PDSCH-specific fields for the unscheduled PDSCH(s) may be reserved and neglected by the UE.

Similarly, for the UL case, the payload size of the DCI format may be determined based on the maximum number of PUSCHs among all TDRA patterns of the at least two TDRA pattern sets which can be scheduled by the DCI format.

Regarding the TDRA pattern set for single carrier scheduling (hereinafter, "set #1"), each TDRA pattern in set #1 may indicate a slot level offset, a mapping type and a starting symbol and length. A code point of the TDRA indicator in a DCI format indicates a TDRA pattern from set #1. In other words, each value of the TDRA indicator may correspond to a respective TDRA pattern in set #1.

In the DL case, the slot level offset (e.g., k0) may indicate the slot level offset between a slot where the DCI format (or the PDCCH) is transmitted and a slot where the PDSCH is transmitted. In the UL case, the slot level offset (e.g., k2) may indicate the slot level offset between a slot where the DCI format is transmitted and a slot where the PUSCH is transmitted. A PDSCH (or PUSCH) mapping type may denote whether the PDSCH (or PUSCH) mapping starts from the slot boundary. For example, Type A means that it starts from the slot boundary and Type B means that it can start at any symbol.

In some examples, the starting symbol and length field may indicate a start and length indicator value (SLIV). The SLIV may indicate a start symbol of a scheduled transmission (e.g., PDSCH or PUSCH) in a slot and the number of consecutive symbols in the same slot or a different slot of the scheduled transmission. In some examples, the starting symbol and length field may indicate a start symbol S corresponding to a starting position of a scheduled transmission (e.g., PDSCH or PUSCH) and an allocation length L of the scheduled transmission, for example, how many symbols are occupied by a PDSCH.

An example to signal the TDRA pattern set for single carrier PDSCH scheduling according to some embodiments of the present disclosure is illustrated below.

```
PDSCH-TimeDomainResourceAllocation::= SEQUENCE
{
    k0 INTEGER(0..32),
    mappingType ENUMERATED {typeA, typeB},
    startSymbolAndLength INTEGER (0..127),
}
```

Regarding the TDRA pattern set for multiple carrier scheduling (hereinafter, "set #2"), each TDRA pattern in set #2 may indicate a plurality of sets of {slot level offset, mapping type and starting symbol and length}. A code point of the TDRA indicator in a DCI format indicates a TDRA pattern from set #2.

A TDRA pattern in set #2 may be able to schedule up to a certain number (e.g., M) of transmissions (e.g., PDSCHs or PUSCHs). The value of M is less than or equal to the maximum number of transmissions (e.g., PDSCHs or PUSCHs) scheduled by a DCI format. The numbers of the schedulable transmissions of different TDRA patterns in set #2 may be the same or different. In other words, the value of M may vary from TDRA pattern to TDRA pattern.

The M schedulable transmissions of a specific TDRA pattern in set #2 may correspond to up to M scheduled carriers, which are indicated by the DCI format or preconfigured by RRC signaling, according to a mapping scheme. For example, the DCI format may indicate a scheduled carrier pattern indicating the actually scheduled carriers, the number of which may be the same or smaller than M.

In some examples, the mapping scheme may be a consecutive one-to-one mapping scheme. For instance, in the case that the number of actually scheduled carriers (e.g., P) is smaller than M, the consecutive one-to-one mapping scheme may include a first mapping between the first PDSCH of the TDRA pattern and the first scheduled carrier, a second mapping between the second PDSCH of the TDRA pattern and the second scheduled carrier, . . . and a last mapping (the $P^{th}$ mapping) between the $P^{th}$ PDSCH of the TDRA pattern and the last scheduled carrier. In the case that the number of actually scheduled carriers is the same as M, the consecutive one-to-one mapping scheme may include a first mapping between the first PDSCH of the TDRA pattern and the first scheduled carrier, a second mapping between the second PDSCH of the TDRA pattern and the second scheduled carrier, . . . and a last mapping (the $M^{th}$ mapping) between the last PDSCH of the TDRA pattern and the last scheduled carrier.

In some other examples, the mapping scheme may be a corresponding one-to-one mapping scheme. For instance, assuming that a UE may be configured with four carriers (e.g., carrier #1 to carrier #4), and PDSCHs are scheduled on some of the four carriers (e.g., carrier #1, carrier #3, and carrier #4) which are indicated by, for example, a carrier indicator field in the DCI format, the corresponding one-to-one mapping scheme may include a first mapping between the first PDSCH of the TDRA pattern and carrier #1, a second mapping between the third PDSCH of the TDRA pattern and carrier #3, and a third mapping between the fourth PDSCH of the TDRA pattern and carrier #4. In the case that carrier #1 to carrier #4 are all scheduled for PDSCH transmission, the corresponding one-to-one mapping scheme may include a first mapping between the first PDSCH of the TDRA pattern and carrier #1, a second mapping between the second PDSCH of the TDRA pattern and carrier #2, a third mapping between the third PDSCH of the TDRA pattern and carrier #3, and a fourth mapping between the fourth PDSCH of the TDRA pattern and carrier #4. Other mapping schemes may be employed.

Various methods may be employed to configure the TDRA pattern in set #2. For example, in some embodiments of the present disclosure, for a TDRA pattern in set #2, each of the M transmissions (e.g., PDSCHs or PUSCHs) may correspond to a respective slot level offset, a respective mapping type, a respective starting symbol and length (hereinafter, "option 1"). In option 1, full scheduling flexibility can be achieved while the RRC signaling overhead is relatively high. An example to signal such set #2 for multiple carrier PDSCH scheduling is illustrated below. It is noted that below examples for multiple carrier PDSCH scheduling can be extended to multiple carrier PUSCH scheduling by replacing "PDSCH" with "PUSCH" and replacing "k0" with "k2".

```
PDSCH-TimeDomainResourceAllocation::= SEQUENCE
{
    k0 for 1st PDSCH INTEGER(0..32),
    mappingType for 1st PDSCH ENUMERATED {typeA, typeB},
    startSymbolAndLength for 1st PDSCH INTEGER (0..127),
    k0 for 2nd PDSCH INTEGER(0..32),
    mappingType for 2nd PDSCH ENUMERATED {typeA, typeB},
    startSymbolAndLength for 2nd PDSCH INTEGER (0..127),
    ...
    k0 for Mth PDSCH INTEGER(0..32),
    mappingType for Mth PDSCH ENUMERATED {typeA, typeB},
    startSymbolAndLength for Mth PDSCH INTEGER (0..127)
}
```

In some embodiments of the present disclosure, for a TDRA pattern in set #2, each of the M transmissions (e.g., PDSCHs or PUSCHs) may correspond to a respective starting symbol and length. A single slot level offset, a single mapping type or both may be indicated for the M transmissions of the TDRA pattern. This method is hereinafter referred to as "option 2." In option 2, the RRC signaling overhead is relatively low at the cost of restrictions on scheduling flexibility.

In some examples, a TDRA pattern in set #2 may indicate a single slot level offset, a respective mapping type and a respective starting symbol and length for each of the plurality of PDSCHs or PUSCHs. An example to signal such set #2 for multiple carrier PDSCH scheduling is illustrated below.

```
PDSCH-TimeDomainResourceAllocation::= SEQUENCE
{
    k0 INTEGER(0..32),
    mappingType for 1st PDSCH ENUMERATED {typeA, typeB},
    startSymbolAndLength for 1st PDSCH INTEGER (0..127),
    mappingType for 2nd PDSCH ENUMERATED {typeA, typeB},
    startSymbolAndLength for 2nd PDSCH INTEGER (0..127),
    ...
    mappingType for Mth PDSCH ENUMERATED {typeA, typeB},
    startSymbolAndLength for Mth PDSCH INTEGER (0..127)
}
```

In some other examples, a TDRA pattern in set #2 may indicate a single slot level offset, a single mapping type and a respective starting symbol and length for each of the plurality of PDSCHs or PUSCHs. An example to signal such set #2 for multiple carrier PDSCH scheduling is illustrated below.

```
PDSCH-TimeDomainResourceAllocation::= SEQUENCE
{
    k0 INTEGER(0..32),
    mappingType ENUMERATED {typeA, typeB},
    startSymbolAndLength for 1st PDSCH INTEGER (0..127),
    startSymbolAndLength for 2nd PDSCH INTEGER (0..127),
    ...
    startSymbolAndLength for Mth PDSCH INTEGER (0..127)
}
```

In option 2, a single slot level offset is indicated for the M transmissions (e.g., PDSCHs or PUSCHs) of a TDRA pattern in set #2. In the case that the M transmissions use the same subcarrier spacing (SCS), the single slot level offset is shared among the M transmissions. In other words, the M transmissions may have the same slot level offset. In the case that the M transmissions use different SCSs, an implicit rule for determining the actual slot level offset may be applied. Details regarding the rule will be described in the following text in combination with FIGS. 4 and 5. In some other embodiments, the BS may indicate which rule is applied.

In some embodiments of the present disclosure, the single slot level offset (e.g., k0 for PDSCH or k2 for PUSCH) of a TDRA pattern may be applied to the carrier with the highest SCS value among the plurality of scheduled carriers. The slot (hereinafter, "slot #H") allocated for a scheduled transmission (e.g., PDSCH or PUSCH) on the carrier with the highest SCS value may be determined based on the single slot level offset, for example, according to the following equations:

$$\left\lfloor n \cdot \frac{2^{\mu_{PDSCH}}}{2^{\mu_{PDCCH}}} \right\rfloor + k_0 \tag{1}$$

$$\left\lfloor n \cdot \frac{2^{\mu_{PUSCH}}}{2^{\mu_{PDCCH}}} \right\rfloor + k_2 \tag{2}$$

In these embodiments, n in the above equations is the slot with the scheduling DCI, and $\mu_{PDSCH}$, $\mu_{PUSCH}$ and $\mu_{PDCCH}$ in the above equations are the SCS configurations for the PDSCH with the highest SCS, the PUSCH with the highest SCS, and the PDCCH carrying the DCI, respectively.

For example, Table 1 below shows exemplary SCS configurations for different SCSs. It should be understood that Table 1 is only for illustrative purposes, and should not be construed as limiting the embodiments of the present disclosure.

TABLE 1

| SCS configuration $\mu$ for different SCSs | |
|---|---|
| $\mu$ | $\Delta f = 2^{\mu} \cdot 15[KHz]$ |
| 0 | 15 |
| 1 | 30 |
| 2 | 60 |
| 3 | 120 |
| 4 | 240 |

TABLE 1-continued

| SCS configuration μ for different SCSs | |
| --- | --- |
| μ | $\Delta f = 2^\mu \cdot 15$[KHz] |
| 5 | 480 |
| 6 | 960 |

In the above Table 1, the SCS configuration, μ is associated with a corresponding SCS (listed in the second column of Table 1). For example, "μ=4" may indicate an SCS of 240 kHz.

The slots (hereinafter, "remaining slots") allocated for the remaining scheduled transmissions (e.g., PDSCHs or PUSCHs) on the remaining carriers of the plurality of scheduled carriers may be determined based on slot #H. For example, the remaining slots overlap slot #H in the time domain.

Figure 4:
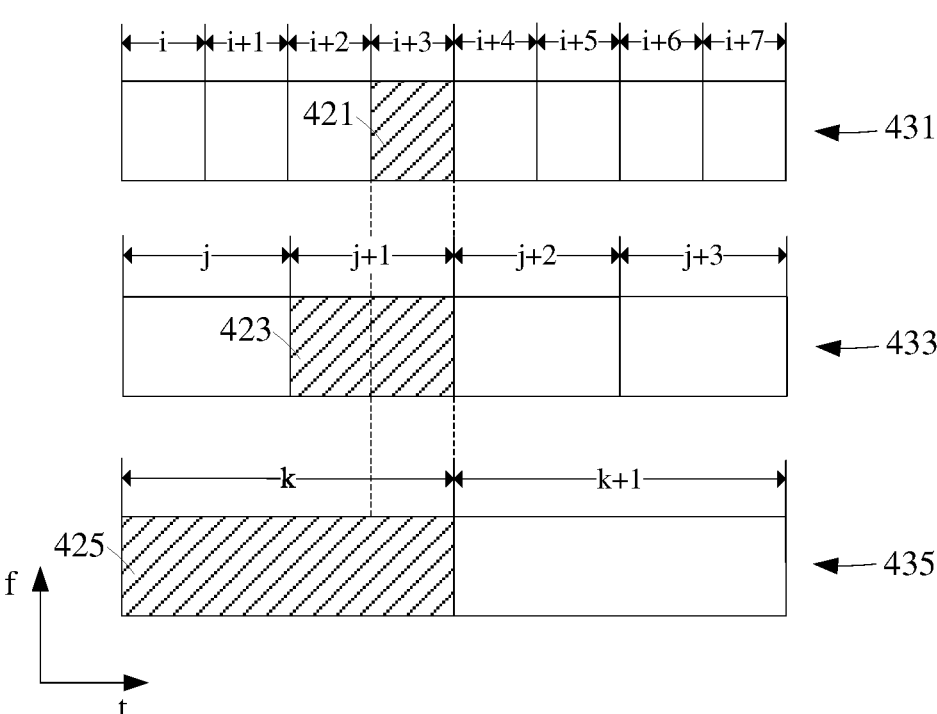
FIG. 4 illustrates a schematic diagram of a slot determination rule in accordance with some embodiments of the present disclosure.

FIG. 4 illustrates a schematic diagram 400 of a slot determination rule in accordance with some embodiments of the present disclosure. Details described in all of the foregoing embodiments of the present disclosure are applicable for the embodiments shown in FIG. 4.

Referring to FIG. 4, a DCI format may schedule a plurality of PDSCHs (e.g., PDSCHs 421, 423, and 425) on a plurality of carriers (e.g., carriers 431, 433, and 435), respectively.

It is assumed that the three carriers have different SCS values, for example, carriers 431, 433, and 435 have 60 kHz SCS, 30 kHz SCS and 15 kHz SCS, respectively. The single slot level offset is applied to carrier 431 with the highest 60 kHz SCS. For example, a UE may determine that the slot for PDSCHs 421 on carrier 431 is slot i+3. Since slot j+1 on carrier 433 and slot k on carrier 435 overlap slot i+3 in the time domain, the UE may further determine that the slot for PDSCHs 423 on carrier 433 is slot j+1, and the slot for PDSCHs 425 on carrier 435 is slot k.

In some other embodiments of the present disclosure, the single slot level offset (e.g., k0 for PDSCH or k2 for PUSCH) of a TDRA pattern may be applied to the carrier with the lowest SCS value among the plurality of scheduled carriers. The slot (hereinafter, "slot #L") allocated for a scheduled transmission (e.g., PDSCH or PUSCH) on the carrier with the lowest SCS value may be determined based on the single slot level offset, for example, according to the above equations (1) and (2). In these embodiments, n in the above equations (1) and (2) is the slot with the scheduling DCI, and $\mu_{PDSCH}$, $\mu_{PUSCH}$ and $\mu_{PDCCH}$ are the SCS configurations for the PDSCH with the lowest SCS, the PUSCH with the lowest SCS, and the PDCCH carrying the DCI, respectively.

The slots (hereinafter, "remaining slots") allocated for the remaining scheduled transmissions (e.g., PDSCHs or PUSCHs) on the remaining carriers of the plurality of scheduled carriers may be determined based on slot #L. For example, the remaining slots are slots first to overlap slot #L in the time domain.

Figure 5:
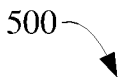
FIG. 5 illustrates a schematic diagram of a slot determination rule in accordance with some embodiments of the present disclosure.
Figure 5:
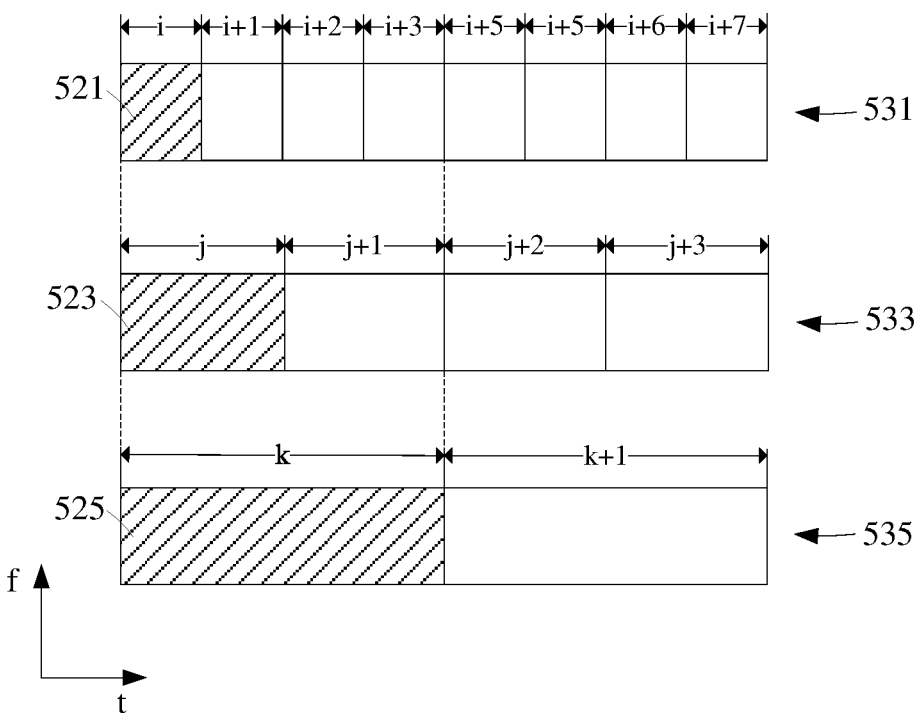

FIG. 5 illustrates a schematic diagram 500 of a slot determination rule in accordance with some embodiments of the present disclosure. Details described in all of the foregoing embodiments of the present disclosure are applicable for the embodiments shown in FIG. 5.

Referring to FIG. 5, a DCI format may schedule a plurality of PDSCHs (e.g., PDSCHs 521, 523, and 525) on a plurality of carriers (e.g., carriers 531, 533, and 535), respectively.

It is assumed that the three carriers have different SCS values, for example, carriers 531, 533, and 535 have 60 kHz SCS, 30 kHz SCS and 15 kHz SCS, respectively. The single slot level offset is applied to carrier 535 with the lowest 15 kHz SCS. For example, a UE may determine that the slot for PDSCHs 525 on carrier 535 is slot k. Since slot i on carrier 531 and slot j on carrier 533 are the slots first to overlap slot k in the time domain on the respective carriers, the UE may further determine that the slot for PDSCHs 521 on carrier 531 is slot i, and the slot for PDSCHs 523 on carrier 533 is slot j.

In some embodiments of the present disclosure, a single slot level offset, a single mapping type, and a single starting symbol and length may be indicated for the M transmissions (e.g., PDSCHs or PUSCHs) of a TDRA pattern in set #2. The TDRA pattern may also indicate the number of schedulable PDSCHs (e.g., M). This method is hereinafter referred to as "option 3." In option 3, the RRC signaling overhead is relatively low at the cost of restrictions on scheduling flexibility.

An example to signal such set #2 for multiple carrier PDSCH scheduling is illustrated below.

```
PDSCH-TimeDomainResourceAllocation::= SEQUENCE
{
    K0 INTEGER(0..32),
    mappingType ENUMERATED {typeA, typeB},
    startSymbolAndLength INTEGER (0..127),
    numberOfScheduledPDSCHs INTEGER(0..Maximum number
of scheduled PDSCHs)
}
```

In option 3, a single slot level offset is indicated for the M transmissions (e.g., PDSCHs or PUSCHs) of a TDRA pattern in set #2. In the case that the M transmissions use the same SCS, the single slot level offset is shared among the M transmissions. In the case that the M transmissions use different SCSs, the rules for determining the actual slot level offset as described above with respect to option 2 (e.g., FIGS. 4 and 5) are applicable and thus omitted herein.

In option 3, a single starting symbol and length is indicated for the M transmissions (e.g., PDSCHs or PUSCHs) of a TDRA pattern in set #2. The single starting symbol and length is applied independently to each scheduled carrier, especially when the different SCS values are configured on these carriers.

For example, assuming that two PDSCHs (e.g., PDSCH #1 and PDSCH #2) are respectively scheduled on two carriers (e.g., carrier #1 and carrier #2), a UE may determine that PDSCH #1 is scheduled on slot i of carrier #1 and PDSCH #2 is scheduled on slot j of carrier #2 based on the DCI format. Assuming that the DCI format indicates a starting symbol and length with a starting symbol of 2 and a length of 8, the UE may determine that PDSCH #1 is scheduled from symbol 2 to symbol 9 of slot i of carrier #1, and PDSCH #2 is scheduled from symbol 2 to symbol 9 of slot j of carrier #2.

In some other embodiments, in option 3, the single starting symbol and length can be applied to the carrier with the lowest SCS value among the plurality of scheduled carriers, and the resource allocation in time domain for each of the other scheduled carrier among the plurality of scheduled carriers has the same time domain resource as the carrier with the lowest SCS value among the plurality of scheduled carriers.

For example, assuming that two PDSCHs (e.g., PDSCH #A1 and PDSCH #A2) are respectively scheduled on two carriers (e.g., carrier #A1 and carrier #A2), and carrier #A1 uses 15 kHz subcarrier spacing while carrier #A2 uses 30 kHz subcarrier spacing, a UE may determine the time domain resource for PDSCH #A1 on carrier #A1 based on the single starting symbol and length in the corresponding scheduled (e.g., slot i). Assuming that the UE determines that symbol 0 to symbol 6 in slot i is allocated to PDSCH #A1, the UE may further determine that the time domain resource on carrier #A1 corresponds to symbol 0 to symbol 13 on carrier #A2 since the time domain resource of symbol 0 to symbol 13 on carrier #A2 is exactly the same as the time domain resource of symbol 0 to symbol 6 on carrier #A1. In other words, the UE may determine that PDSCH #A2 is scheduled on symbol 0 to symbol 13 in the corresponding scheduled slot (e.g., slot j) on carrier #A2.

In some other embodiments, in option 3, the single starting symbol and length can be applied to the carrier with the highest SCS value among the plurality of scheduled carriers, and the resource allocation in time domain for each of the other scheduled carrier among the plurality of scheduled carriers has the same time domain resource as the carrier with the highest SCS value among the plurality of scheduled carriers.

In some embodiments of the present disclosure, instead of configuring at least two TDRA pattern sets for separate single carrier scheduling and multiple carrier scheduling, a single set of TDRA patterns (hereinafter, "set #3") including hybrid scheduling may be configured by RRC signaling. For example, at least one TDRA pattern of set #3 may be only applicable to single carrier scheduling, and at least one different TDRA pattern of set #3 may be only applicable to multiple carrier scheduling.

In these embodiments, a single DCI format can be used to schedule either one PDSCH (or PUSCH) on one carrier or a plurality of PDSCHs (or PUSCHs) on a plurality of carriers, dependent on the specific TDRA pattern in set #3 supporting single carrier scheduling or multiple carrier scheduling.

For example, a DCI format may include a TDRA indicator to indicate a specific TDRA pattern of set #3 applied to the PDSCH(s) (or PUSCH(s)) scheduled by the DCI format. A code point of the TDRA indicator in the DCI format indicates a TDRA pattern (either for single carrier scheduling or multiple carrier scheduling) from set #3.

In the case that the TDRA indicator indicates a TDRA pattern including a plurality of PDSCHs (or PUSCHs), the UE may assume that a plurality of PDSCHs (or PUSCHs) are scheduled on a plurality of carriers. In the case that the TDRA indicator indicates a TDRA pattern including a single PDSCH (or PUSCH), the UE may assume that a single PDSCH (or PUSCH) is scheduled on a single carrier.

A size (e.g., the number of bits) of the TDRA indicator may be determined based on the numbers of TDRA patterns in set #3. For example, the DCI format may include $\lceil \log_2 N_3 \rceil$ bits to indicate the TDRA pattern applied to the scheduled PDSCH(s) (or PUSCH(s)), where $N_3$ is the number of TDRA patterns in set #3. In some examples, the maximum value of $N_3$ may be configured from a set of {8, 16, 32, etc.}.

Some fields, for example, the HARQ process number, the frequency domain resource allocation indicator, the MCS, and so on, in the DCI format, may be PDSCH-specific fields (or PUSCH-specific) fields. In other words, these fields may be configured per respective scheduled PDSCH (or PUSCH). The payload size of the DCI format may be determined based on the maximum number of PDSCHs (or PUSCHs) among all TDRA patterns of set #3 which can be scheduled by the DCI format. For example, assuming that set #3 includes a TDRA pattern that can schedule a maximum of Y PDSCHs among all TDRA patterns of set #3, the payload size may be determined based on the value of Y. When the number of actually scheduled PDSCHs is smaller than the maximum number of schedulable PDSCHs (e.g., Y), the PDSCH-specific fields for the unscheduled PDSCH(s) may be reserved and neglected by the UE.

Similar to the TDRA pattern in set #1 as described above, each TDRA pattern for single carrier scheduling in set #3 may indicate a slot level offset (e.g., k0 or k2), a mapping type and a starting symbol and length.

Similar to the TDRA pattern in set #2 as described above, each TDRA pattern for multiple carrier scheduling in set #3 may indicate a plurality of sets of {slot level offset (e.g., k0 or k2), mapping type and starting symbol and length}. The number of schedulable transmissions (e.g., PDSCHs or PUSCHs) can be different in respective TDRA patterns for multiple carrier scheduling in set #3.

Assuming that a TDRA pattern in set #3 is able to schedule up to M1 transmissions (e.g., PDSCHs or PUSCHs). The M1 schedulable transmissions of the TDRA pattern in set #3 may correspond to up to M1 scheduled carriers, which are indicated by the DCI format or preconfigured by RRC signaling, according to a mapping scheme. The mapping schemes (e.g., consecutive one-to-one mapping scheme and corresponding one-to-one mapping scheme) described above with respect to the TDRA pattern in set #2 are applicable to the TDRA pattern for multiple carrier scheduling in set #3 and thus omitted herein.

Various methods may be employed to configure the TDRA pattern for multiple carrier scheduling in set #3. The methods described above with respect to the TDRA pattern in set #2 (e.g., options 1-3) are applicable to the TDRA pattern for multiple carrier scheduling in set #3 and thus omitted herein.

In some embodiments of the present disclosure, a set of TDRA patterns (hereinafter, "set #4") may be configured by RRC signaling for the carrier(s) on which an LTE system is not operated (e.g., NR-only carrier, non-DSS carrier, or carrier not shared with the LTE system).

A DCI format may include a TDRA indicator to indicate a specific TDRA pattern of set #4 applied to the PDSCH(s) (or PUSCH(s)) scheduled by the DCI format on a scheduled carrier on which an LTE system is not operated. A code point of the TDRA indicator in the DCI format indicates a TDRA pattern from set #4.

A size (e.g., the number of bits) of the TDRA indicator may be determined based on the numbers of TDRA patterns in set #4. For example, the DCI format may include $\lceil \log_2 N_4 \rceil$ bits to indicate the TDRA pattern applied to the scheduled PDSCH(s) (or PUSCH(s)), where $N_4$ is the number of TDRA patterns in set #4. In some examples, the maximum value of $N_4$ may be configured from a set of {8, 16, 32, etc.}.

Similar to the TDRA pattern in set #1 as described above, each TDRA pattern in set #4 may indicate a slot level offset (e.g., k0 or k2), a mapping type and a starting symbol and length.

A UE may first determine the scheduled slot (hereinafter, "slot #NR") on a scheduled carrier on which an LTE system is not operated based on the TDRA pattern indicated by a DCI format, and may then determine the scheduled slot(s) (hereinafter, "slot #DSS") on the scheduled carrier(s) on which an LTE system is operated (e.g., DSS carrier, or carrier shared with the LTE system) based on slot #NR.

For example, the UE may determine slot #NR based on the slot level offset of the TDRA pattern, for example, according to the above equations (1) or (2). In these embodiments, n in the above equations (1) or (2) is the slot with the scheduling DCI, and $\mu_{PDSCH}$, $\mu_{PUSCH}$ and $\mu_{PDCCH}$ in the above equations (1) or (2) are the SCS configurations for the PDSCH on the carrier on which an LTE system is not operated, the PUSCH on the carrier on which an LTE system is not operated, and the PDCCH carrying the DCI, respectively.

The UE may determine slot(s) #DSS on the scheduled carrier(s) on which an LTE system is operated based on slot #NR. For example, in the case that the SCS value of a scheduled DSS carrier is the same as that of the scheduled non-DSS carrier, the UE may determine that a scheduled slot on the scheduled DSS carrier is slot #NR. In the case that the SCS value of a scheduled DSS carrier is smaller than that of the scheduled non-DSS carrier, the scheduled slot on the DSS carrier is the slot overlapped the scheduled slot on the non-DSS carrier in the time domain (similar to FIG. 4). In the case that the SCS value of a scheduled DSS carrier is larger than that of the scheduled non-DSS carrier, the scheduled slot on the DSS carrier is the slot first to overlap the scheduled slot on the non-DSS carrier in the time domain (similar to FIG. 5).

In some embodiments of the present disclosure, the mapping type of a schedule transmission (PDSCH or PUSCH) on a carrier on which an LTE system is operated (e.g., DSS carrier, or carrier shared with the LTE system) is Type B.

Various methods may be employed to indicate the time domain resource(s) in slot(s) #DSS. For example, a new field may be introduced in a DCI format to indicate one of a plurality of symbol sets. In some embodiments of the present disclosure, each of the plurality of symbol sets may include contiguous symbols in the time domain within the same slot. A code point of the new field in the DCI format indicates a symbol set of a plurality of symbol sets. In some embodiments of the present disclosure, a specific code point of the new field can be used to indicate a carrier on which an LTE system is operated is not scheduled. In other words, a specific value of the new field may indicate that only the PDSCH or PUSCH on the carrier on which an LTE system is not operated is scheduled.

The plurality of symbol sets may be predefined, for example, in a standard(s) or configured by RRC signaling.

In some embodiments of the present disclosure, the plurality of symbol sets is predefined, for example, in a standard(s). In some examples, in the scheduled slot (e.g., slot #DSS), the symbols available for NR PDSCH (or PUSCH) scheduling on the DSS carrier are divided into several (e.g., three) symbol sets.

For example, a first symbol set may include the first half of the available symbols, the second symbol set may include the second half of the available symbols, and the third symbol set may include all the available symbols. When the number of available symbols is odd, the first symbol set may include, for example, half of (the number of available symbols minus one), or half of (the number of available symbols plus one). The second symbol set may include the remaining available symbols. In the case of three symbol sets, 2 bits (i.e., $\lceil \log_2(3) \rceil$ bit) may be required in a DCI format, wherein three code points may be used to indicate one symbol set from the three symbol sets, and the remaining one code point may be used to indicate that the DSS carrier is not scheduled.

In some embodiments of the present disclosure, the plurality of symbol sets is configured by RRC signaling. As a principle, due to the front-loaded demodulation reference signal (DMRS), the smallest symbol index indicated by each symbol set should be configured without overlapping a symbol occupied by an LTE CRS in the time domain. In some examples, each symbol set may be configured in the form of consecutive symbol indexes, such as {5,6,7,8}. In some examples, each symbol set may be configured in the form of a combination of starting symbol and length such as an SLIV or separate start symbol S value and allocation length L value. Examples of how to configure the symbol sets will be illustrated in the following text in combination with FIGS. 6 and 7.

Figure 6:
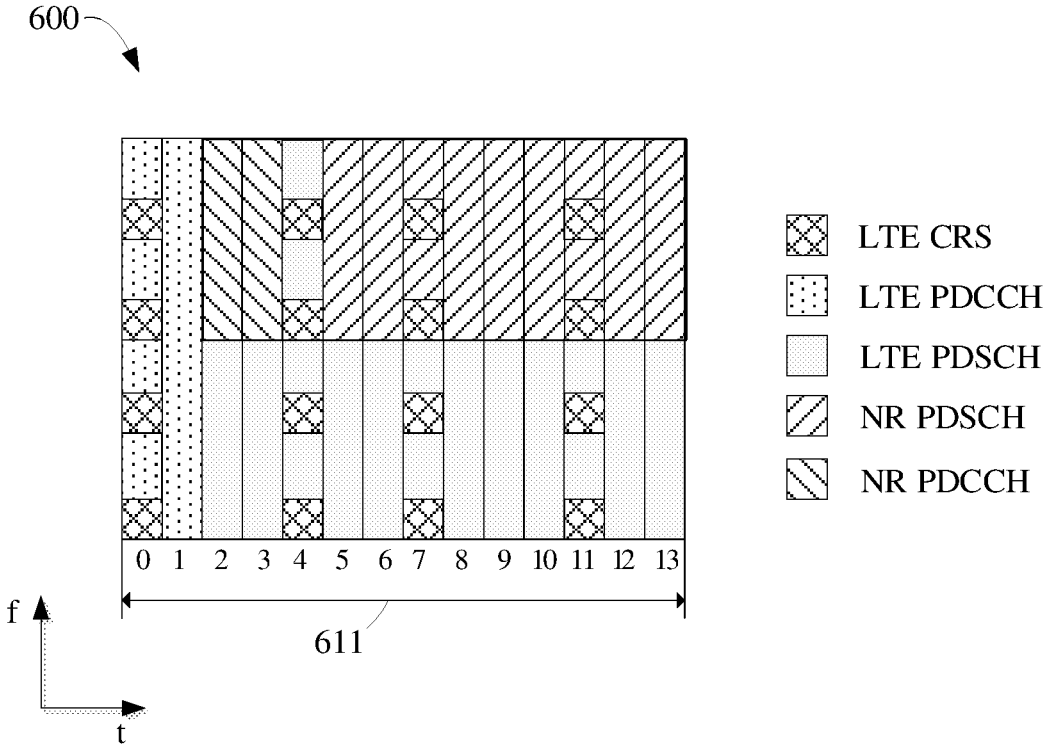
FIG. 6 illustrates an exemplary symbol set configuration in accordance with some embodiments of the present disclosure.

FIG. 6 illustrates an exemplary symbol set configuration 600 in accordance with some embodiments of the present disclosure. Details described in all of the foregoing embodiments of the present disclosure are applicable for the embodiments shown in FIG. 6.

FIG. 6 shows a carrier shared by LTE and NR. One NR slot (e.g., slot 611) on the shared carrier includes 14 NR symbols, which are indexed as symbols 0-13 and marked as 0 to 13 along the time (t) axis in FIG. 6. Assuming that the NR carrier and the LTE carrier have the same SCS, i.e., a 15 kHz SCS, slot 611 in FIG. 6 may correspond to an LTE subframe including two LTE slots, each of which includes 7 LTE symbols. For example, symbols 1-6 of slot 611 may correspond to LTE symbols 0-6 in the first LTE slot, and symbols 7-13 of slot 611 may correspond to LTE symbols 0-6 in the second LTE slot. For clarification, the following contents regarding FIG. 6 are described with reference to NR slot (e.g., slot 611) and NR symbol (e.g., symbols 0-13) in the timer domain.

In FIG. 6, LTE CRS, LTE PDCCH, and NR PDCCH may be transmitted in slot 611 on the shared carrier, wherein the LTE CRSs may be transmitted in symbols 0, 4, 7, and 11 of slot 611. An LTE PDCCH and a NR PDCCH may schedule an LTE PDSCH and a NR PDSCH, respectively. It should be appreciated by persons skilled in the art that the NR PDCCH in FIG. 6 may also schedule a PDSCH(s) on (an)other carrier(s) such as a NR-only carrier (not shown in FIG. 6).

According to FIG. 6, 9 symbols (i.e., symbols 5-13) may be available for NR PDSCH transmission. However, due to LTE CRS in symbols 7 and 11 and the front-loaded DMRS on the PDSCH, each symbol set should be configured without using the symbol 7 or 11 as the beginning symbol. In other words, the smallest symbol index in the symbol set should not include symbols 7 and 11 among the available symbols (symbols 5-13) for NR PDSCH transmission.

Under this principle, for example, a first symbol set can be configured as {5,6,7,8}, a second symbol set can be configured as {9,10,11,12,13}, and a third symbol set can be configured as {5,6,7,8,9,10,11,12,13}. The BS may transmit the above symbol sets via RRC signaling and may indicate in a DCI format carried in the NR PDCCH that one of the symbol sets (e.g., {5,6,7,8}) is applied. The UE may determine that the PDSCH scheduled by the DCI format is transmitted on symbols 5-8 of slot #DSS.

In some examples, the symbol set may be configured in the form of a combination of starting symbol and length such as an SLIV. For example, an SLIV may be determined according to the following method:

if $(L-1) \le 7$ then $$SLIV = 14 \cdot (L-1) + S$$

else $$SLIV = 14 \cdot (14 - L + 1) + (14 - 1 - S), \text{ where } 0 < L \le 14 - S.$$

In the above method, S is the starting symbol relative to the start of a slot, and the number of consecutive symbols L counting from the symbol S allocated for the PDSCH or PUSCH. For example, taking the symbol sets {5,6,7,8}, {9,10,11,12,13}, and {5,6,7,8,9,10,11,12,13} as an example, the corresponding {S, L} values are {5,4}, {9,5}, and {5,9}, and the corresponding SLIVs are 47, 65, and 92, respectively. The BS may configure the symbol sets as {47, 65, and 92} or {5,4}, {9,5}, and {5,9}.

Figure 7:
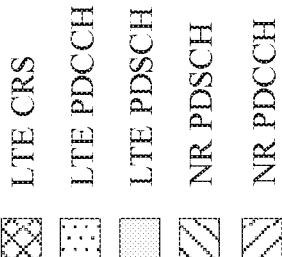
FIG. 7 illustrates an exemplary symbol set configuration in accordance with some embodiments of the present disclosure.
Figure 7:
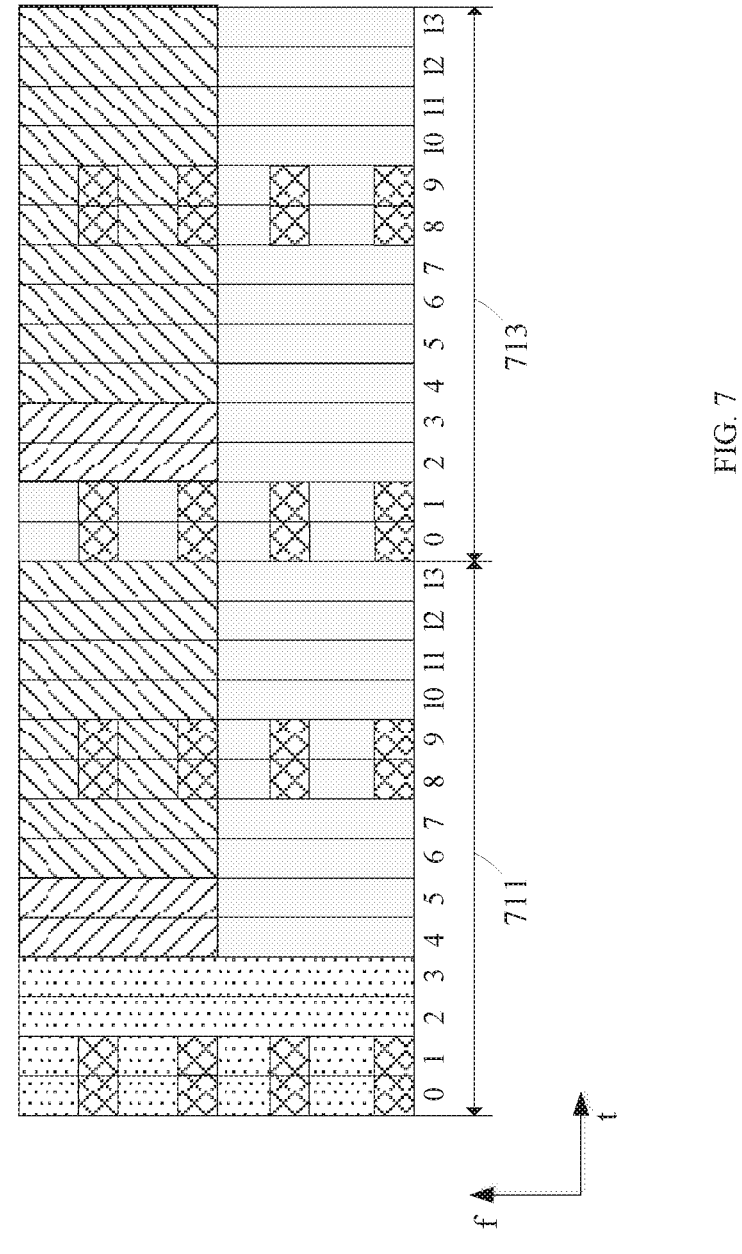

FIG. 7 illustrates an exemplary symbol set configuration 700 in accordance with some embodiments of the present disclosure. Details described in all of the foregoing embodiments of the present disclosure are applicable for the embodiments shown in FIG. 7.

FIG. 7 shows two NR slots (e.g., slots 711 and 713) on a carrier shared by LTE and NR. Each of the NR slots include 14 NR symbols, which are indexed as symbols 0-13 and marked as 0 to 13 along the time (t) axis in FIG. 7.

Assuming that the NR carrier and the LTE carrier have different SCSs, for example, the NR has a 30 kHz SCS and the LTE has a 15 kHz SCS, slots 711 and 713 may correspond to an LTE subframe including two LTE slots. For clarification, the following contents regarding FIG. 7 are described with reference to NR slot (e.g., slots 711 and 713) and NR symbol (e.g., symbols 0-13) in the timer domain.

In FIG. 7, an LTE PDCCH may be transmitted in slot 711 on the shared carrier. LTE CRSs and NR PDCCHs may be transmitted in slots 711 and 713 on the shared carrier, wherein the LTE CRSs may be transmitted in symbols 0, 1, 8, and 9 of slots 711 and 713. An LTE PDCCH and a NR PDCCH may schedule a LTE PDSCH and a NR PDSCH, respectively. It should be appreciated by persons skilled in the art that a NR PDCCH in FIG. 7 may also schedule a PDSCH(s) on (an)other carrier(s) such as a NR-only carrier (not shown in FIG. 7).

According to FIG. 7, 8 symbols (i.e., symbols 6-13) in slot 711 and 10 symbols (i.e., symbols 4-13) in slot 713 may be available for NR PDSCH transmission. Whether available symbols in slot 711 or slot 713 are configured may depend on the NR or LTE PDCCH configuration and whether the NR slot is within slot 711 or slot 713.

However, due to the LTE CRS in symbols 0, 1, 8, and 9 of slots 711 and 713 and the front-loaded DMRS on the PDSCH, each symbol set should be configured without using the symbol 0, 1, 8, or 9 as the beginning symbol. In other words, the smallest symbol index in the symbol set should not include symbols 7 and 11.

Under this principle, for example, a first symbol set can be configured as {4,5,6,7,8}, a second symbol set can be configured as {6,7,8,9,10}, and a third symbol set can be configured as {6,7,8,9,10,11,12,13} or {4,5,6,7,8,9,10,11, 12,13}. The BS may transmit the above symbol sets via RRC signaling and may indicate in a DCI format carried in the NR PDCCH that one of the symbol sets (e.g., {4,5,6,7, 8}) is applied. The UE may determine that the PDSCH scheduled by the DCI format is transmitted on symbols 4-8 of slot #DSS.

In some examples, the symbol set may be configured in the form of a combination of starting symbol and length such as an SLIV or separate start symbol S value and allocation length L value.

Figure 8:
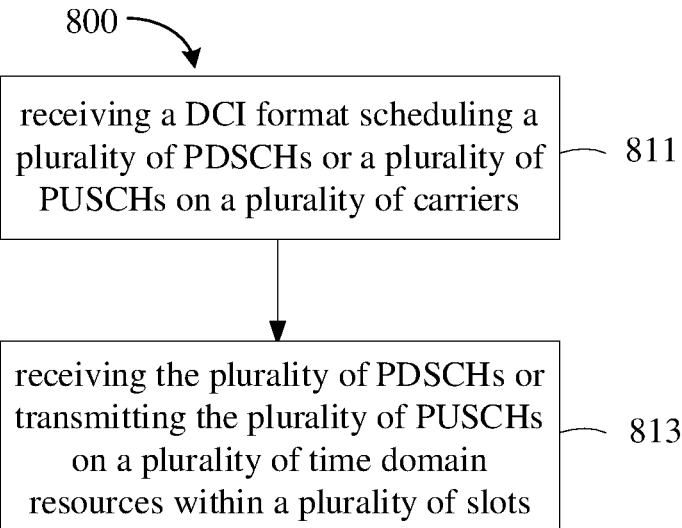
FIG. 8 illustrates a flow chart of an exemplary procedure of wireless communications in accordance with some embodiments of the present disclosure.

FIG. 8 illustrates a flow chart of an exemplary procedure 800 for wireless communications in accordance with some embodiments of the present disclosure. Details described in all of the foregoing embodiments of the present disclosure are applicable for the embodiments shown in FIG. 8. In some examples, the procedure may be performed by a UE, for example, UE 101 in FIG. 1.

Referring to FIG. 8, in operation 811, a UE may receive a DCI format scheduling a plurality of PDSCHs or a plurality of PUSCHs on a plurality of carriers. Each of the plurality of PDSCHs or PUSCHs may be scheduled on a corresponding carrier. For example, referring back to FIG. 2, the DCI format in PDCCH 211 on CC 231 may schedule PDSCH 221 on CC 231 and PDSCH 223 on CC 233.

Referring to FIG. 8, the DCI format may include a TDRA indicator indicating a specific TDRA pattern (hereinafter, "first TDRA pattern") from a set of time domain resource allocation patterns (hereinafter, "first TDRA pattern set") for the plurality of PDSCHs or PUSCHs. The first TDRA pattern set may be configured by RRC signaling.

In operation 813, the UE may receive the plurality of PDSCHs or transmit the plurality of PUSCHs on a plurality of time domain resources (e.g., symbols) within a plurality of slots. The plurality of time domain resources and the plurality of slots may be determined based on the first TDRA pattern. Each of the plurality of time domain resources may be within a corresponding one of the plurality of slots.

In some embodiments of the present disclosure, the first TDRA pattern set may include at least one TDRA pattern indicating a single time domain resource for a single PDSCH or PUSCH. For example, the first TDRA pattern set may be set #3 as described above. The size of the TDRA indicator may be determined based on the number of TDRA patterns in the first TDRA pattern set.

In some embodiments of the present disclosure, for each of the plurality of PDSCHs or PUSCHs, the first TDRA pattern may indicate a respective slot level offset, a respective mapping type, a respective starting symbol and length. The UE may determine the plurality of time domain resources and the plurality of slots based on corresponding slot level offsets and corresponding starting symbol and length values.

In some embodiments of the present disclosure, the first TDRA pattern may indicate: a single slot level offset, a respective mapping type and a respective starting symbol and length for each of the plurality of PDSCHs or PUSCHs; a single slot level offset, a single mapping type, and a respective starting symbol and length for each of the plurality of PDSCHs or PUSCHs; or a single slot level offset, a single mapping type, and a single starting symbol and length, and a total number of PDSCHs or PUSCHs scheduled by the first TDRA pattern.

In the above embodiments, in some examples, the UE may determine, based on the single slot level offset, a first slot (e.g., slot i+3 in FIG. 4) of the plurality of slots on a carrier with the highest SCS value among the plurality of carriers. The remaining slots (e.g., slot j+1 and slot k in FIG. 4) of the plurality of slots on the remaining carriers of the plurality of carriers may overlap the first slot in the time domain.

In some examples, the UE may determine, based on the single slot level offset, a first slot (e.g., slot k in FIG. 5) of the plurality of slots on a carrier with the lowest SCS value among the plurality of carriers. The remaining slots (e.g., slot i and slot j in FIG. 5) of the plurality of slots on the remaining carriers of the plurality of carriers may be the slots first to overlap the first slot in the time domain.

In some embodiments of the present disclosure, the DCI format may include a TDRA pattern set indicator indicating the first TDRA pattern set from at least two sets of TDRA patterns. The size of the TDRA pattern set indicator may be determined based on the numbers of sets of TDRA patterns in the at least two sets of TDRA patterns. The first TDRA pattern set may be configured for scheduling more than one PDSCH or PUSCH. A second set of TDRA patterns of the at least two sets of TDRA patterns may be configured for scheduling a single PDSCH or PUSCH. For example, the two sets of TDRA patterns may include set #1 and set #2 as described above, the first TDRA pattern set may be set #2, and the second TDRA pattern set may be set #1.

In some embodiments of the present disclosure, the first TDRA pattern may be applied to a specific carrier (hereinafter, "first carrier") of the plurality of carriers on which a long term evolution (LTE) system is not operated. For example, the first TDRA pattern set may be set #4 as described above. The mapping type of a PDSCH or PUSCH scheduled on a carrier of the plurality of carriers on which an LTE system is operated may be Type B.

In some embodiments of the present disclosure, in the case that an SCS value of a carrier (hereinafter, "second carrier") of the plurality of carriers on which an LTE system is operated is the same as that of the first carrier, a slot of the plurality of slots on the second carrier may be the same slot scheduled on the first carrier. In the case that the SCS value of the second carrier is smaller than that of the first carrier, the slot of the plurality of slots on the second carrier may overlap the slot scheduled on the first carrier in the time domain. In the case that the SCS value of the second carrier is larger than that of the first carrier, the slot of the plurality of slots on the second carrier may be a slot first to overlap the slot scheduled on the first carrier in the time domain.

In some embodiments of the present disclosure, the DCI format may include a symbol set indicator indicating a symbol set from a plurality of symbol sets. Each of the plurality of symbol sets may include contiguous symbols in the time domain within the same slot for the transmission PDSCH or PUSCH. The plurality of symbol sets may be predefined or configured by RRC signaling. A code point of the symbol set indicator may indicate that the plurality of carriers does not include a carrier on which an LTE system is operated. The smallest symbol index in the symbol set may be configured without overlapping a symbol occupied by an LTE CRS in the time domain.

It should be appreciated by persons skilled in the art that the sequence of the operations in exemplary procedure 800 may be changed and some of the operations in exemplary procedure 800 may be eliminated or modified, without departing from the spirit and scope of the disclosure.

Figure 9:
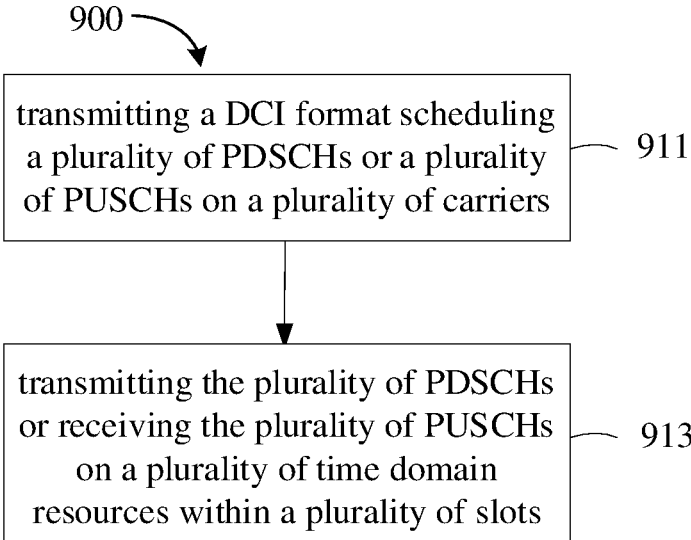
FIG. 9 illustrates a flow chart of an exemplary procedure of wireless communications in accordance with some embodiments of the present disclosure.

FIG. 9 illustrates a flow chart of an exemplary procedure 900 for wireless communications in accordance with some embodiments of the present disclosure. Details described in all of the foregoing embodiments of the present disclosure are applicable for the embodiments shown in FIG. 9. In some examples, the procedure may be performed by a BS, for example, BS 102 in FIG. 1.

Referring to FIG. 9, in operation 911, a BS may transmit a DCI format scheduling a plurality of PDSCHs or a plurality of PUSCHs on a plurality of carriers. Each of the plurality of PDSCHs or PUSCHs may be scheduled on a corresponding carrier. For example, referring back to FIG. 2, the DCI format in PDCCH 211 on CC 231 may schedule PDSCH 221 on CC 231 and PDSCH 223 on CC 233.

Referring to FIG. 9, the DCI format may include a TDRA indicator indicating a specific TDRA pattern (hereinafter, "first TDRA pattern") from a set of time domain resource allocation patterns (hereinafter, "first TDRA pattern set") for the plurality of PDSCHs or PUSCHs. The BS may transmit an RRC signaling indicating the first TDRA pattern set to a UE.

In operation 913, the BS may transmit the plurality of PDSCHs or receive the plurality of PUSCHs on a plurality of time domain resources (e.g., symbols) within a plurality of slots. The plurality of time domain resources and the plurality of slots may be determined based on the first TDRA pattern. Each of the plurality of time domain resources may be within a corresponding one of the plurality of slots.

In some embodiments of the present disclosure, the first TDRA pattern set may include at least one TDRA pattern indicating a single time domain resource for a single PDSCH or PUSCH. For example, the first TDRA pattern set may be set #3 as described above. The size of the TDRA indicator may be determined based on the number of TDRA patterns in the first TDRA pattern set.

In some embodiments of the present disclosure, for each of the plurality of PDSCHs or PUSCHs, the first TDRA pattern may indicate a respective slot level offset, a respective mapping type, a respective starting symbol and length. The UE may determine the plurality of time domain resources and the plurality of slots based on corresponding slot level offsets and corresponding starting symbol and length values.

In some embodiments of the present disclosure, the first TDRA pattern may indicate: a single slot level offset, a respective mapping type and a respective starting symbol and length for each of the plurality of PDSCHs or PUSCHs; a single slot level offset, a single mapping type, and a respective starting symbol and length for each of the plurality of PDSCHs or PUSCHs; or a single slot level offset, a single mapping type, and a single starting symbol and length, and a total number of PDSCHs or PUSCHs scheduled by the first TDRA pattern.

In the above embodiments, in some examples, the BS may determine, based on the single slot level offset, a first slot (e.g., slot i+3 in FIG. 4) of the plurality of slots on a carrier with the highest SCS value among the plurality of carriers. The remaining slots (e.g., slot j+1 and slot k in FIG. 4) of the plurality of slots on the remaining carriers of the plurality of carriers may overlap the first slot in the time domain.

In some examples, the BS may determine, based on the single slot level offset, a first slot (e.g., slot k in FIG. 5) of the plurality of slots on a carrier with the lowest SCS value among the plurality of carriers. The remaining slots (e.g., slot i and slot j in FIG. 5) of the plurality of slots on the remaining carriers of the plurality of carriers may be the slots first to overlap the first slot in the time domain.

In some embodiments of the present disclosure, the DCI format may include a TDRA pattern set indicator indicating the first TDRA pattern set from at least two sets of TDRA patterns. The size of the TDRA pattern set indicator may be determined based on the numbers of sets of TDRA patterns in the at least two sets of TDRA patterns. The first TDRA pattern set may be configured for scheduling more than one PDSCH or PUSCH. A second set of TDRA patterns of the at least two sets of TDRA patterns may be configured for scheduling a single PDSCH or PUSCH. For example, the two sets of TDRA patterns may include set #1 and set #2 as described above, the first TDRA pattern set may be set #2, and the second TDRA pattern set may be set #1.

In some embodiments of the present disclosure, the first TDRA pattern may be applied to a specific carrier (hereinafter, "first carrier") of the plurality of carriers on which a long term evolution (LTE) system is not operated. For example, the first TDRA pattern set may be set #4 as described above. The mapping type of a PDSCH or PUSCH scheduled on a carrier of the plurality of carriers on which an LTE system is operated may be Type B.

In some embodiments of the present disclosure, in the case that an SCS value of a carrier (hereinafter, "second carrier") of the plurality of carriers on which an LTE system is operated is the same as that of the first carrier, a slot of the plurality of slots on the second carrier may be the same slot scheduled on the first carrier. In the case that the SCS value of the second carrier is smaller than that of the first carrier, the slot of the plurality of slots on the second carrier may overlap the slot scheduled on the first carrier in the time domain. In the case that the SCS value of the second carrier is larger than that of the first carrier, the slot of the plurality of slots on the second carrier may be a slot first to overlap the slot scheduled on the first carrier in the time domain.

In some embodiments of the present disclosure, the DCI format may include a symbol set indicator indicating a symbol set from a plurality of symbol sets. Each of the plurality of symbol sets may include contiguous symbols in the time domain within the same slot for the transmission PDSCH or PUSCH. The plurality of symbol sets may be predefined, or the BS may transmit an RRC signaling indicating the plurality of symbol sets. A code point of the symbol set indicator may indicate that the plurality of carriers does not include a carrier on which an LTE system is operated. The smallest symbol index in the symbol set may be configured without overlapping a symbol occupied by an LTE CRS in the time domain.

It should be appreciated by persons skilled in the art that the sequence of the operations in exemplary procedure 900 may be changed and some of the operations in exemplary procedure 900 may be eliminated or modified, without departing from the spirit and scope of the disclosure.

Figure 10:
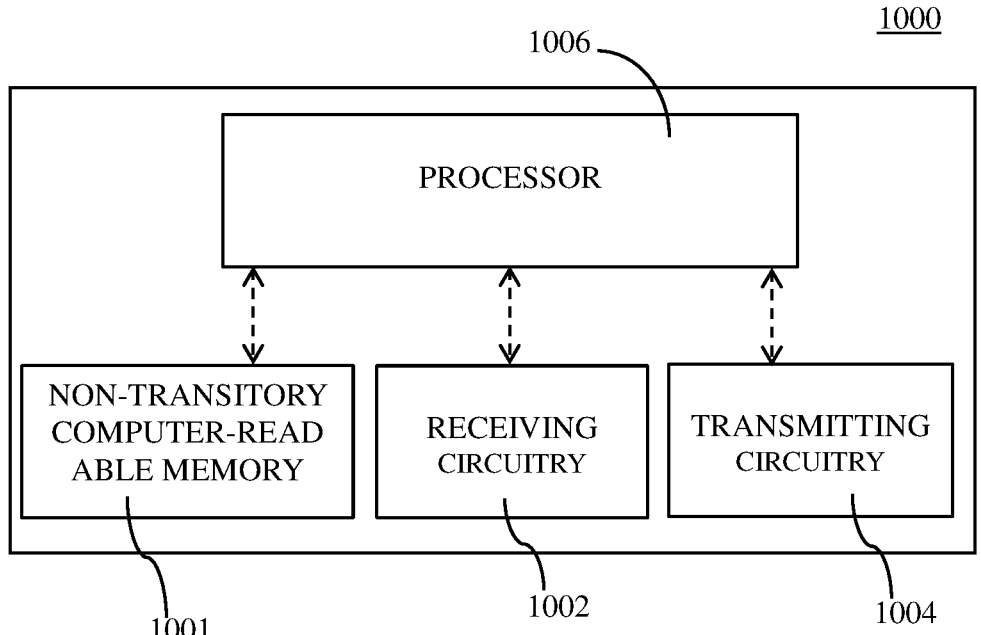
FIG. 10 illustrates a block diagram of an exemplary apparatus in accordance with some embodiments of the present disclosure.

FIG. 10 illustrates a block diagram of an exemplary apparatus 1000 according to some embodiments of the present disclosure.

As shown in FIG. 10, the apparatus 1000 may include at least one non-transitory computer-readable medium 1001, at least one receiving circuitry 1002, at least one transmitting circuitry 1004, and at least one processor 1006 coupled to the non-transitory computer-readable medium 1001, the receiving circuitry 1002 and the transmitting circuitry 1004. The apparatus 1000 may be a base station side apparatus (e.g., a BS) or a communication device (e.g., a UE).

Although in this figure, elements such as the at least one processor 1006, transmitting circuitry 1004, and receiving circuitry 1002 are described in the singular, the plural is contemplated unless a limitation to the singular is explicitly stated. In some embodiments of the present application, the receiving circuitry 1002 and the transmitting circuitry 1004 are combined into a single device, such as a transceiver. In certain embodiments of the present application, the apparatus 1000 may further include an input device, a memory, and/or other components.

In some embodiments of the present disclosure, the non-transitory computer-readable medium 1001 may have stored thereon computer-executable instructions to cause a processor to implement the method with respect to the UEs as described above. For example, the computer-executable instructions, when executed, cause the processor 1006 interacting with receiving circuitry 1002 and transmitting circuitry 1004, so as to perform the operations with respect to the UEs described in FIGS. 1-8.

In some embodiments of the present disclosure, the non-transitory computer-readable medium 1001 may have stored thereon computer-executable instructions to cause a processor to implement the method with respect to the BSs as described above. For example, the computer-executable instructions, when executed, cause the processor 1006 interacting with receiving circuitry 1002 and transmitting circuitry 1004, so as to perform the operations with respect to the BSs described in FIGS. 1-7 and 9.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. A user equipment (UE) for wireless communication, comprising:
   at least one memory; and
   at least one processor coupled to the at least one memory and operable to cause the UE to:
      receive configuration information for a first set of time domain resource allocation patterns for multi-cell scheduling, wherein the first set of time domain resource allocation patterns comprises a plurality of entries, and wherein each entry contains time domain resource assignment information for a plurality of cells;
      receive a downlink control information (DCI) format scheduling a plurality of physical downlink shared channels (PDSCHs) or a plurality of physical uplink shared channels (PUSCHs) on a plurality of carriers, wherein each PDSCH of the plurality of PDSCHs or each PUSCH of the plurality of PUSCHs is scheduled on a corresponding carrier of the plurality of carriers, and wherein the DCI format includes a first indicator indicating a first time domain resource allocation pattern from the first set of time domain resource allocation patterns for the plurality of PDSCHs or the plurality of PUSCHs; and receive the plurality of PDSCHs or transmit the plurality of PUSCHs on a plurality of time domain resources within a plurality of slots based at least in part on the first time domain resource allocation pattern, wherein each of the plurality of time domain resources is within a corresponding slot of the plurality of slots.

2. The UE of claim 1, wherein the first set of time domain resource allocation patterns includes at least one time domain resource allocation pattern indicating a single time domain resource for one or more of a single PDSCH or a single PUSCH.

3. The UE of claim 1, wherein a size of the first indicator is determined based at least in part on a number of time domain resource allocation patterns in the first set of time domain resource allocation patterns.

4. The UE of claim 1, wherein for each of the one or more of the plurality of PDSCHs or the plurality of PUSCHs, the first time domain resource allocation pattern indicates a respective slot level offset, a respective mapping type, a respective starting symbol, and a respective length.

5. The UE of claim 1, wherein the first time domain resource allocation pattern indicates at least one of:

a single slot level offset, a respective mapping type, and a respective starting symbol and length for each of the one or more of the plurality of PDSCHs or the plurality of PUSCHs;

a single slot level offset, a single mapping type, and a respective starting symbol and length for each of the one or more of the plurality of PDSCHs or the plurality of PUSCHs; or a single slot level offset, a single mapping type, and a single starting symbol and length, and a total number of PDSCHs or PUSCHs scheduled by the first time domain resource allocation pattern.

6. The UE of claim 5, wherein the processor is configured to cause the UE to:

determine, based at least in part on the single slot level offset, a first slot of the plurality of slots on a carrier with a highest subcarrier spacing (SCS) value among the plurality of carriers, wherein remaining slots of the plurality of slots on remaining carriers of the plurality of carriers overlap the first slot in time domain; or determine, based at least in part on the single slot level offset, a first slot of the plurality of slots on a carrier with a lowest subcarrier spacing (SCS) value among the plurality of carriers, wherein remaining slots of the plurality of slots on remaining carriers of the plurality of carriers comprise slots first to overlap the first slot in time domain.

7. The UE of claim 1, wherein the DCI format further includes a second indicator indicating the first set of time domain resource allocation patterns from at least two sets of time domain resource allocation patterns.

8. The UE of claim 7, wherein the first set of time domain resource allocation patterns is configured for scheduling at least one of more than one PDSCH or more than one PUSCH.

9. The UE of claim 7, wherein a second set of time domain resource allocation patterns of the at least two sets of time domain resource allocation patterns is configured for scheduling one or more of a single PDSCH or a single PUSCH.

10. The UE of claim 1, wherein the first time domain resource allocation pattern is applied to a first carrier of the plurality of carriers, wherein the first carrier comprises a new radio (NR)-only carrier.

11. The UE of claim 10, wherein:

in an event that a subcarrier spacing (SCS) value of a second carrier of the plurality of carriers on which an LTE system is operated is a same SCS as that of the first carrier, a slot of the plurality of slots on the second carrier is the same slot scheduled on the first carrier;

in an event that the SCS value of the second carrier is smaller than that of the first carrier, the slot of the plurality of slots on the second carrier overlaps the slot scheduled on the first carrier in time domain; and in an event that the SCS value of the second carrier is larger than that of the first carrier, the slot of the plurality of slots on the second carrier is a slot first to overlap the slot scheduled on the first carrier in time domain.

12. The UE of claim 10, wherein the DCI format further includes a third indicator indicating a symbol set from a plurality of symbol sets, and each of the plurality of symbol sets comprises contiguous symbols in time domain within a same slot for transmission of one or more of PDSCH or PUSCH.

13. The UE of claim 12, wherein a code point of the third indicator indicates that the plurality of carriers excludes a carrier on which an LTE system is operated.

14. The UE of claim 12, wherein a smallest symbol index in the symbol set is configured without overlapping a symbol occupied by an LTE cell reference signal (CRS) in time domain.

15. A method performed by a user equipment (UE), the method comprising:

receiving configuration information for a first set of time domain resource allocation patterns for multi-cell scheduling, wherein the first set of time domain resource allocation patterns comprises a plurality of entries, and wherein each entry contains time domain resource assignment information for a plurality of cells;

receiving a downlink control information (DCI) format scheduling a plurality of physical downlink shared channels (PDSCHs) or a plurality of physical uplink shared channels (PUSCHs) on a plurality of carriers, wherein each PDSCH of the plurality of PDSCHs or each PUSCH of the plurality of PUSCHs is scheduled on a corresponding carrier of the plurality of carriers, and wherein the DCI format includes a first indicator indicating a first time domain resource allocation pattern from the first set of time domain resource allocation patterns for the one or more of the plurality of PDSCHs or the plurality of PUSCHs; and receiving the plurality of PDSCHs or transmitting the plurality of PUSCHs on a plurality of time domain resources within a plurality of slots based at least in part on the first time domain resource allocation pattern, wherein each of the plurality of time domain resources is within a corresponding slot of the plurality of slots.

16. The method of claim 15, wherein the first set of time domain resource allocation patterns includes at least one time domain resource allocation pattern indicating a single time domain resource for one or more of a single PDSCH or a single PUSCH.

17. The method of claim 15, wherein a size of the first indicator is determined based at least in part on a number of time domain resource allocation patterns in the first set of time domain resource allocation patterns.

18. The method of claim 15, wherein for each of the one or more of the plurality of PDSCHs or the plurality of PUSCHs, the first time domain resource allocation pattern indicates a respective slot level offset, a respective mapping type, a respective starting symbol, and a respective length.

19. The method of claim 15, wherein the first time domain resource allocation pattern indicates at least one of:

a single slot level offset, a respective mapping type, and a respective starting symbol and length for each of the one or more of the plurality of PDSCHs or the plurality of PUSCHs;

a single slot level offset, a single mapping type, and a respective starting symbol and length for each of the one or more of the plurality of PDSCHs or the plurality of PUSCHs; or a single slot level offset, a single mapping type, and a single starting symbol and length, and a total number of PDSCHs or PUSCHs scheduled by the first time domain resource allocation pattern.

20. A base station for wireless communication, comprising:

at least one memory; and at least one processor coupled to the at least one memory and operable to cause the base station to:

transmit configuration information for a first set of time domain resource allocation patterns for multi-cell scheduling, wherein the first set of time domain resource allocation patterns comprises a plurality of entries, and wherein each entry contains time domain resource assignment information for a plurality of cells in a scheduled cell set;

transmit a downlink control information (DCI) format scheduling a plurality of physical downlink shared channels (PDSCHs) or a plurality of physical uplink shared channels (PUSCHs) on a plurality of carriers, wherein each PDSCH of the plurality of PDSCHs or each PUSCH of the plurality of PUSCHs is scheduled on a corresponding carrier of the plurality of carriers, and wherein the DCI format includes a first indicator indicating a first time domain resource allocation pattern from the first set of time domain resource allocation patterns for the plurality of PDSCHs or the plurality of PUSCHs; and transmit the plurality of PDSCHs or receive the plurality of PUSCHs on a plurality of time domain resources within a plurality of slots based at least in part on the first time domain resource allocation pattern, wherein each of the plurality of time domain resources is within a corresponding slot of the plurality of slots.

* * * * *